United States Patent
Timm et al.

Patent Number: 5,478,424
Date of Patent: Dec. 26, 1995

[54] PROCESS FOR JOINING COMPONENTS MADE OF METAL

[75] Inventors: Jürgen Timm, Steisslingen, Germany; Peter Furrer, Pfungen, Switzerland

[73] Assignee: Alusuisse-Lonza Services Ltd., Zurich, Switzerland

[21] Appl. No.: 209,709

[22] Filed: Mar. 14, 1994

[30] Foreign Application Priority Data

Apr. 6, 1993 [CH] Switzerland .................. 01053/930

[51] Int. Cl.⁶ .................................................. B32B 31/00
[52] U.S. Cl. .................. 156/219; 156/275.5; 156/275.7; 156/272.8
[58] Field of Search ............................... 156/272.2, 275.7, 156/219, 220, 209, 272.8

[56] References Cited

U.S. PATENT DOCUMENTS 3,878,428  4/1975  Kuzminski .

FOREIGN PATENT DOCUMENTS 0311323  4/1989  European Pat. Off. .
3238651  4/1982  Germany .

*Primary Examiner*—Chester T. Barry
*Attorney, Agent, or Firm*—Bachman & LaPointe

[57] ABSTRACT

A process for joining components made of metal, in particular aluminum and aluminum alloys, is such that a thermally-curable (hardenable) adhesive is deposited between the close-fitting surfaces of the components that are to be joined, and one of the outer surfaces neighboring the said close-fitting surface of one of the components is radiated with infra-red radiation in order to cure the adhesive. At least the outer surface to be radiated is provided with a pattern that roughens that surface. By reducing the reflectivity of the roughened surface the capacity to absorb infrared radiation is increased. A preferred application for the process is in the adhesive bonding of shaped parts, especially body sheet in automobile manufacture.

11 Claims, No Drawings

PROCESS FOR JOINING COMPONENTS MADE OF METAL

BACKGROUND OF THE INVENTION

The invention relates to a process for joining components made of metal, in particular aluminum and aluminum alloys, by means of a thermally-curable (hardenable) adhesive deposited between the close-fitting surfaces of the components that are to be joined, wherein one of the outer surfaces neighboring the said close-fitting surface of one of the components is radiated with infra-red radiation to cure the adhesive.

Among the methods used to join metallic components adhesive bonding is gaining increasingly in importance. Also, in the automobile industry increasing efforts are being made to replace or supplement spot welding by adhesive bonding. An example of this is the joining of the inner and outer sheets of the bodywork. The strength requirements made of bodywork joints can be satisfied reliably today only by means of thermally-curable adhesives. In practice therefore the problem arises as to how the heat for curing the adhesive can be optimally applied. The following possibilities are available for that purpose:

The whole structure can be placed in a furnace. For large parts this means there must be a large furnace of sufficient capacity. One disadvantage of this process is that the whole structure must be heated up. As a result other parts could be damaged by the heat e.g. electrical wising or thermoplastic fittings.

The parts bearing adhesive are treated with hot air. With this method there is the problem that, especially where there are metals involved that conduct heat readily, for example components of aluminum or aluminum alloys, heat is lost rapidly by thermal conduction. In order to maintain a high temperature locally during the curing operation, it is necessary, therefore, to supply a correspondingly large amount of heat.

It is also possible to achieve localized heating by means of direct contact with flexible thermal cushions and bindings. This method, however, requires good contact and therefore careful attachment of the heating elements, which in turn requires access to the joint from all sides.

Using infra-red radiation a large amount of heat can be applied, easily and locally, to compensate for heat losses due to thermal radiation from metals, in particular aluminum and aluminum alloys. The high reflectivity of metallic surfaces, however, reduces the absorbtion of heat and can lead to the infra-red sources becoming overheated and to soldered or brazed joints melting.

A means of overcoming the above mentioned disadvantages of curing with infra-red radiation is known from EP-B-O 311 323 in that a coating that absorbs infra-red radiation is applied to the surface to be radiated i.e. the outer surface neighboring the close-fitting surface of one of the components to be joined. The coating, normally black acrylic resin, is applied prior to radiation only to part of the outer surface of the components to be joined. After the curing operation, the black resin coating has to be removed using solvents.

SUMMARY OF THE INVENTION

In view of the above, the object of the present invention is, for the purpose of curing joints, to develop a process of the kind mentioned at the start, in which infra-red radiation can be employed without additionally applying a coating. The process shotfid in particular be suitable for adhesively bonding car body parts in a simple and efficient manner.

That object is achieved by way of the invention in that at least the outer surface of the components which is to be radiated is provided with a pattern that roughens the surface. The said pattern is preferably isotropic.

The roughening of the metal surface reduces its reflectivity, and improves the absorption characteristic. The process according to the invention is particularly suitable for adhesively bonding structures where at least one of the components is a sheet.

DETAILED DESCRIPTION OF PREFERRED EMBODIMENTS

Texturing the surface with a rough pattern is usefully achieved by means of work rolls the surface of which bears the pattern that can be readily transferred to the surface of the component in a rolling pass that effects a small reduction in thickness. As with all such imprinting processes the topography of the roll surface and the surface of the component coming into contact with the rolls are complementary, i.e. peaks and raised areas on the roll surface become valleys and depressions in the surface of the component and vice versa.

The roughening of sheets of aluminum or aluminum alloys is usually such that the pattern on the work rolls is preferably transferred to the sheet in the last pass in the rolling mill, at the same time effecting a reduction of 3 to 5% in sheet thickness.

Suitable patterns for performing the process according to the invention are achieved by imprinting a surface texture into the sheet surface using work rolls, the surfaces of which are roughened by the following processes:

1. EDT—Electrical Discharge Texturing. In the EDT process the roll is rotated past a row of electrodes at the same time experiencing axial oscillation so that the surface is textured to a preselected depth. The discharge of electrical energy between the electrodes and the roll surface which are separated by a dielectric medium causes small craters to be formed in the surface of the roll. The roughness of the roll can be selected by known means via a number of machine parameters. The pattern of roughness is a random distribution of peaks and valleys. The EDT process makes it possible to select average roughness values $R_a$ of 1 to 6 µm. The average roughness value and peak number are to a large extent dependent on each other. Particularly suitable for the process according to the invention is a surface texture of low roughness and high peak number.

2. SBT—Shot Blast Texturing. In the SBT process sharp edged particulate shot is fed to a centrifuge which then directs it at the work roll. On striking the roll surface the individual shot particles release their kinetic energy, in the process plastically deforming the roll surface. The roughness of the roll can be regulated by the choice of average shot particle size, the speed of rotation of the centrifuge and other machine parameters. Average roughness values $R_a$ of 1.5 to 6 µm can be achieved. The pattern of roughness is again a random distribution of peaks and valleys.

3. Lasertex. With this method, a laser beam is focussed by a lens onto the roll surface and interrupted by means of a chopper wheel. At the same time the roll is rotated and displaced in its axial direction. The roll surface at the focal point of the laser beam is melted locally. The desired roughness is achieved by selecting the speed of rotation of the roll and the intensity and position of focus of the laser beam. The pattern of roughness is that of uniformally distributed craters on the roll surface.

4. EBG— Electron Beam Craving. In the EBG process a rotating beam which is under vacuum is led past a stationary electron beam source. On striking the roll the high energy electrons release their kinetic energy in the form of heat. At sufficiently high temperature the volume of metal struck by the beam melts and partially evaporates. The pattern left on the surface of the roll is comparable with that created by the lasertex process. The crater depth can be varied at will and depends on the duration of heating. The diameter of the crater depends on the focussing of the electron beam.

5. Isomill process. In the Isomill process grooves are engraved in the work rolls, circumferentially and in the axial direction, producing an essentially quadratic pattern of roughness on the surface.

The EDT process for roughening work rolls has been found to be particularly suitable for roughening aluminum and aluminum alloys for the process according to the invention. Reflectivity measurements according to DIN 67530 performed on samples of aluminum sheets with the standard mill finish and with a surface that had been roughness textured by one of the EDT processes showed that the latter exhibited much reduced reflectivity compared with the standard surface:

| Direction of rolling | Reflectivity values (angles of incedence and observation = 85°) | |
| --- | --- | --- |
|  | Mill finish | EDT |
| Parallel to rolling direction | 75% | 18% |
| Transverse to rolling direction | 23% | 18% |

The standard mill finish surface is produced using rolls which have fine circumferential grooves engraved in them. For texturing the surface of aluminum sheets it is useful to produce first the standard mill finish surface and then to imprint the desired pattern of roughness on that standard surface m a final roll pass.

A particular advantage of the process according to the invention is seen in its application for adhesively bonding shaped parts, especially body panels in automobile manufacture. Apart from the reduction in the reflectivity of the sheet surface, and the subsequent, markedly improved absorption of infra-red radiation, the formability of the sheet is also improved by the isotropic roughening pattern.

In the interest of completeness it should be mentioned here that the process according to the invention is not limited to the use of a particular adhesive. All thermally curable single or multi-component adhesives such as e.g. epoxy, phenolic or acrylic types of adhesive are suitable.

Likewise, the components that are to be joined, especially sheets roughened on one or both sides, may be provided with a primer or corrosion protection such as an oxide layer by anodising or a chromate/phosphate conversion layer.

We claim:

1. Process which comprises joining components made of metal by means of a thermally-curable adhesive deposited between close-fitting surfaces of the components that are to be joined, wherein at least one component is a sheet, wherein an outer surface neighboring the close-fitting surface of one of the components is radiated with infra-red radiation to cure the adhesive, including the step of providing the outer surface that is to be radiated with a pattern that roughens the outer surface wherein the pattern is transferred to the outer surface from at least one work roll, a surface of which had been correspondingly roughened, and wherein the pattern is transferred in an imprinting pass effecting a reduction in sheet thickness of 3 to 5%, whereby the reflectivity of the roughened outer surface is reduced and infra-red radiation absorption is improved.

2. Process according to claim 1 wherein the metal components are aluminum or alloys thereof.

3. Process according to claim 2 wherein the roughening pattern is isotropic.

4. Process according to claim 1 wherein the surface of the work rolls are roughened using a spark erosion electrical discharge texturing process.

5. Process according to claim 1 wherein the surfaces of the work rolls are roughened using a centrifugal shot blast texturing process.

6. Process according to claim 1 wherein the surfaces of the work rolls are roughened using a laser beam.

7. Process according to claim 1 wherein the surfaces of the work rolls are roughened using an electron beam.

8. Process according to claim 1 wherein grooves are engraved in the work rolls running circumferentially and in the perpendicular axial direction forming an essentially quadratic pattern.

9. Process according to claim 1 wherein the roughening pattern is transferred to a sheet having a standard mill finish.

10. Process according to claim 1 including the step of adhesively bonding shaped parts.

11. Process according to claim 10 including the step of adhesively bonding body sheets in automobile manufacture.

* * * * *